U S 0 0 9 2 1 5 6 3 1 B 2

US009215631B2

(12) United States Patent
Rexhepi et al.

(10) Patent No.: US 9,215,631 B2
(45) Date of Patent: Dec. 15, 2015

(54) METHOD, APPARATUS AND COMPUTER PROGRAM PRODUCT FOR SOURCE IDENTIFICATION FOR SINGLE RADIO VOICE CALL CONTINUITY

(75) Inventors: Vlora Rexhepi, Den Hoorn (NL); Curt Wong, Sammamish, WA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/148,884

(22) PCT Filed: Feb. 8, 2010

(86) PCT No.: PCT/IB2010/000233
§ 371 (c)(1),
(2), (4) Date: Aug. 10, 2011

(87) PCT Pub. No.: WO2010/092449
PCT Pub. Date: Aug. 19, 2010

(65) Prior Publication Data
US 2011/0319082 A1    Dec. 29, 2011

Related U.S. Application Data

(60) Provisional application No. 61/151,204, filed on Feb. 10, 2009.

(51) Int. Cl.
*H04W 36/00* (2009.01)

(52) U.S. Cl.
CPC ...... *H04W 36/0066* (2013.01); *H04W 36/0022* (2013.01)

(58) Field of Classification Search
CPC ............ H04W 36/0066; H04W 36/00; H04W 36/0022
USPC ............... 455/436–444, 456.3; 370/328, 331, 370/337, 338, 344
See application file for complete search history.

(56) References Cited

U.S. PATENT DOCUMENTS

2003/0207688 A1 * 11/2003 Nikkelen ............... 455/439
2008/0049677 A1 *  2/2008 Hayashi ................ 370/331
(Continued)

FOREIGN PATENT DOCUMENTS

AU      2010212579 B2    5/2013
JP      2003-032133 A    1/2003
(Continued)

OTHER PUBLICATIONS

3GPP TS 23.216 V8.2.0 (Dec. 2008).*
(Continued)

*Primary Examiner* — Kiet Doan
*Assistant Examiner* — Dung Lam
(74) *Attorney, Agent, or Firm* — Alston & Bird LLP

(57) ABSTRACT

An apparatus for enabling source identification for single radio voice call continuity (SR-VCC) in relation to a handover between different RATs may include at least one processor and at least one memory including computer program code. The at least one memory and the computer program code may be configured, with the processor, to cause the apparatus to perform at least receiving an indication of handover between a first radio access technology and a second radio access technology, defining an identity value for source identification associated with the first radio access technology by utilizing a source identification format associated with a third radio access technology, and providing the defined identity value to a network device associated with a target of the handover. A corresponding method and computer program product are also provided.

17 Claims, 3 Drawing Sheets

(56) References Cited

U.S. PATENT DOCUMENTS

| | | | |
|---|---|---|---|
| 2009/0252118 A1* | 10/2009 | Nasielski et al. | 370/331 |
| 2010/0284350 A1* | 11/2010 | Korhonen et al. | 370/329 |
| 2012/0003974 A1* | 1/2012 | Nylander et al. | 455/435.2 |

FOREIGN PATENT DOCUMENTS

| | | |
|---|---|---|
| JP | 2006-503500 A | 1/2006 |
| WO | WO 2004/036770 A2 | 4/2004 |
| WO | 2007103496 A1 | 9/2007 |
| WO | WO 2008/047039 A1 | 4/2008 |
| WO | 2008058877 A1 | 5/2008 |
| WO | WO 2010/092449 A1 | 8/2010 |

OTHER PUBLICATIONS

International Search Report and Written Opinion of the International Searching Authority for corresponding Patent Cooperation Treaty Application No. PCT/IB2010/000233 dated Jun. 4, 2010, pages.

Digital Cellular Telecommunications system (Phase 2+); Packed-Switched handover for GERAN A/Gb mode; Stage 2 (3GPP TS 43.129 version 6.5.0 Release 6); ETSI TS 143 129, PUB: ETSI Standards, PD Nov. 1, 2011, LIS, Sophia Antipolis Cedex, France.

Single Radio Voice Call Continuity; PUB: 3GPP Draft; S2-063159, PD: Aug. 22, 2006; 3rd Generation Partnership Project (3GPP), Mobile Competence Center; 650, route des Lucioles; F06921 Sophia-Antipolis, Cedex, France. AU: Vodafone.

Some Consideration on Inter-RAT PS mobility between UTRAN and E-UTRAN Pub: 3GPP Draft; R3-082647, PD: Sep. 24, 2008, 3rd Generation Partnership Project (3GPP), Mobile Competence Centre; 650, route des Lucioles; F-06921 Sophia-Antipolis Cedex; France, AU Nokia Siemens Networks; Nokia Corporation.

Office Action for Indonesian Application No. W00 2011 03161; dated Jan. 22, 2013.

Office Action from Korean Patent Application No. 2012-067418218, dated Nov. 8, 2012.

Office Action from Japanese Patent Application No. 2011-548802, dated Nov. 21, 2012.

Australian Patent Examination Report No. 1 for Application No. 2012021579, dated Feb. 8, 2013.

Substantive Examination Adverse Report for Malaysian Patent Application No. PI2011003474, mailed May 15, 2014.

Subsequent Substantive Examination Report for Philippines Application No. 1-2011-501593 dated Sep. 16, 2013.

Office Action for Canadian Application No. 2,752,036 dated Jul. 10, 2014.

Completion of Final Requirements from Philippine Application No. 1-2011-501593 dated Feb. 23, 2015.

Office Action for corresponding Vietnamese Application No. Jan. 2011-02338 dated Aug. 27, 2015.

* cited by examiner

METHOD, APPARATUS AND COMPUTER PROGRAM PRODUCT FOR SOURCE IDENTIFICATION FOR SINGLE RADIO VOICE CALL CONTINUITY

RELATED APPLICATION

This application was originally filed as PCT Application No. PCT/IB32010/000233, filed Feb. 8, 2010, which claims priority benefit from U.S. Provisional Patent Application No. 61/151,204, filed Feb. 10, 2009.

TECHNOLOGICAL FIELD

Embodiments of the present invention relate generally to communication session continuity in a multiple radio access technology (RAT) environment and, more particularly, relate to an apparatus, method and a computer program product for enabling source identification for single radio voice call continuity (SR-VCC) in relation to a handover between different RATs.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Such increased ease of information transfer and convenience to users has recently been accompanied by an increased ability to provide mobile communications at a relatively low cost. Accordingly, mobile communication devices are becoming ubiquitous in the modern world. With the rapid expansion of mobile communications technology, there has been a related rapid expansion in those services that are demanded and provided via mobile communication devices.

BRIEF SUMMARY OF EXEMPLARY EMBODIMENTS

A method, apparatus and computer program product are therefore provided that may enable changes to inter-RAT handovers in a multi-RAT environment. In this regard, for example, some embodiments of the present invention may provide a mechanism by which a Source ID may be defined in a manner that may not require updates to existing nodes to support the SR-VCC solution.

BRIEF DESCRIPTION OF THE SEVERAL VIEWS OF THE DRAWINGS

Figure 1:
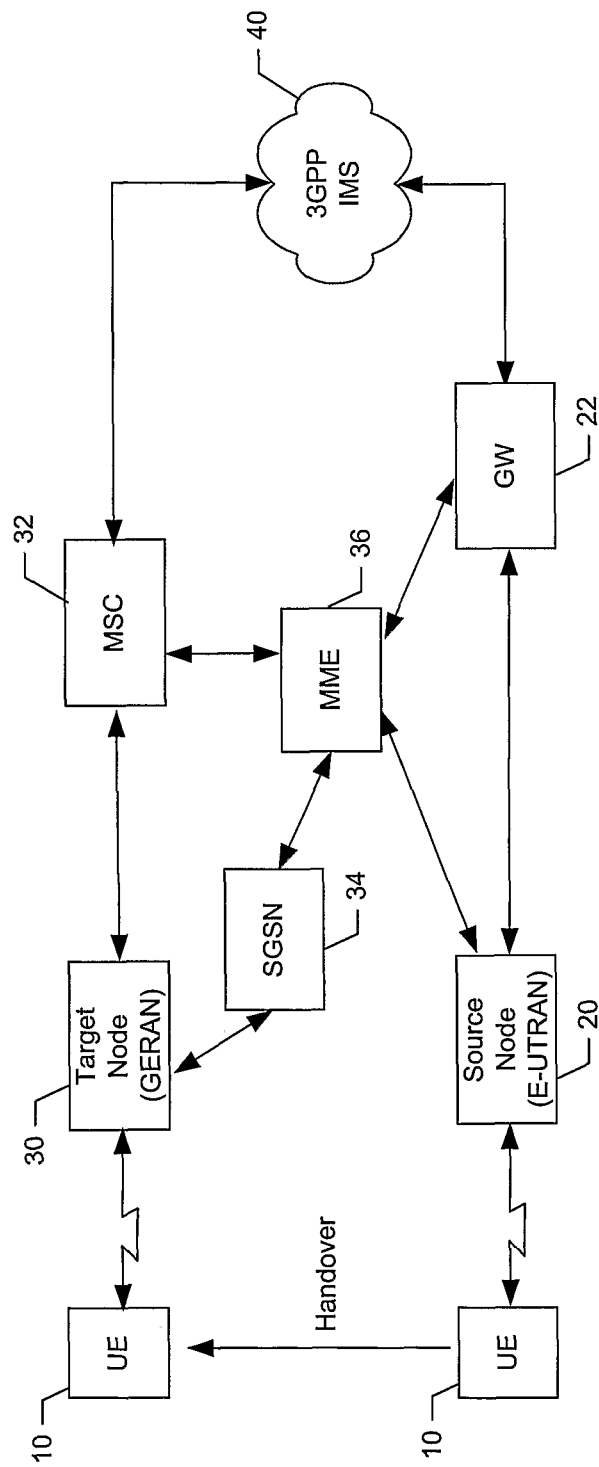
Figure 2:
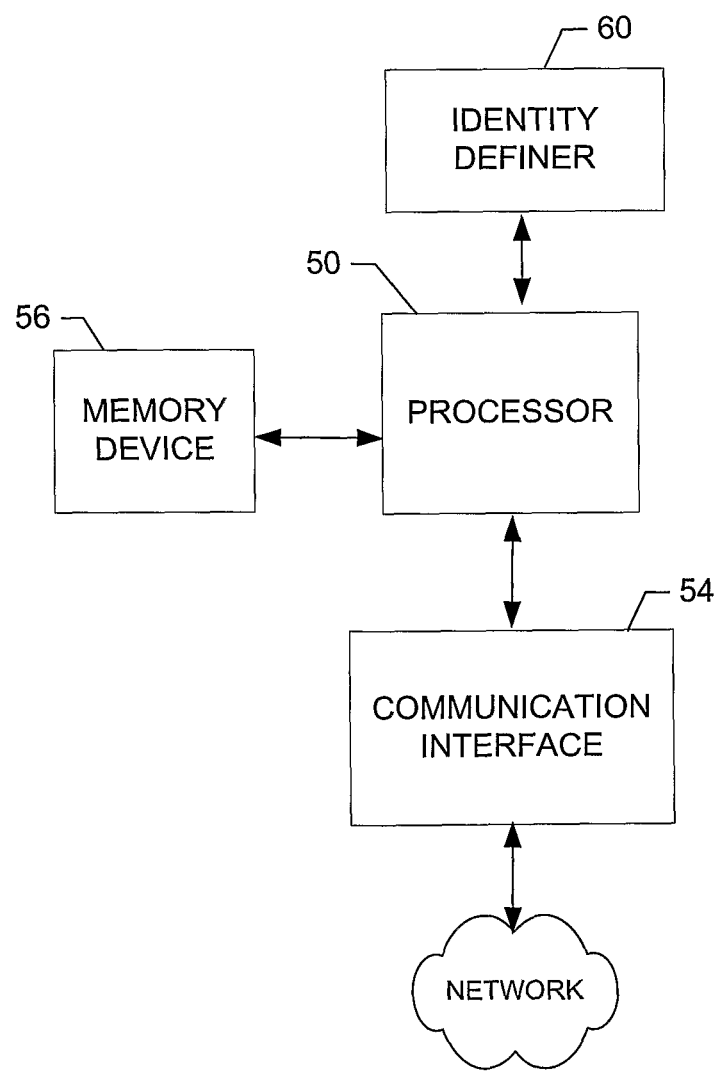
Figure 3:
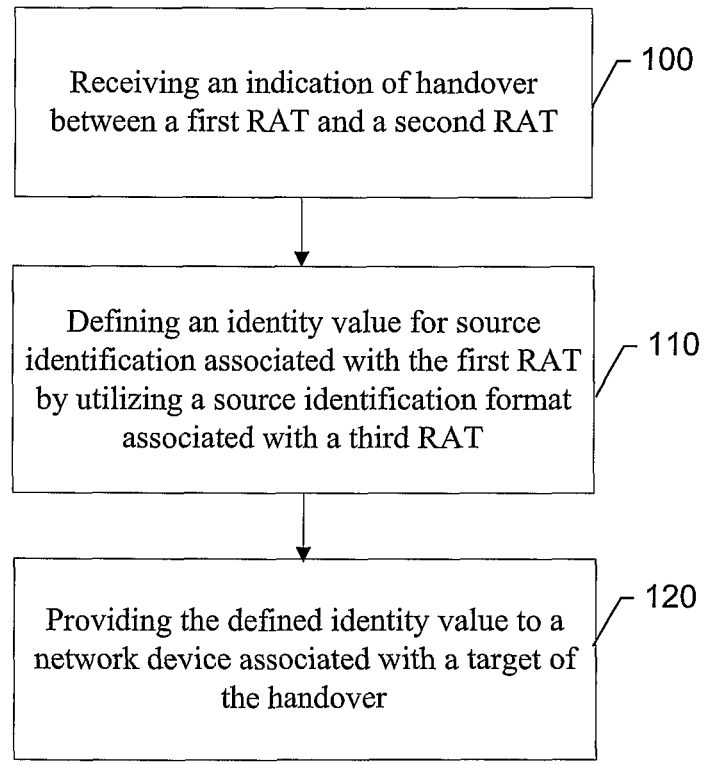

Having thus described the invention in general terms, reference will now be made to the accompanying drawings, which are not necessarily drawn to scale, and wherein:

FIG. 1 a schematic block diagram of a wireless communications system according to an exemplary embodiment of the present invention;

FIG. 2 illustrates a block diagram of an apparatus for enabling source identification for single radio voice call continuity (SR-VCC) in relation to a handover between different RATs according to an exemplary embodiment of the present invention; and FIG. 3 is a flowchart according to an exemplary method of enabling source identification for SR-VCC in relation to a handover between different RATs according to an exemplary embodiment of the present invention.

DETAILED DESCRIPTION

Over the history of mobile communications, there have been many different generations of systems developed to enable the use of such communication devices. The first generations of these systems were sometimes developed independently and, at least initially, were not necessarily usable in cooperation with other systems. However, cooperation between communication system developers began to be employed so that new technologies could be enabled to have the potential for synergistic cooperation with other technologies in order to increase overall capacity. Thus, a mobile terminal operable in second generation (for example, 2G) systems such as GSM (global system for mobile communications) or IS-95, which replaced the first generation of systems, may in some cases be useable in cooperation with newer generation systems such as third generation systems (for example, 3G) and others that are currently being developed (for example, E-UTRAN (Evolved Universal Terrestrial Radio Access Network)).

The ability of a particular mobile terminal to access multiple systems or communicate via multiple radio access technologies (multi-RATs) is sometimes referred to as "multi-radio access" (MRA). An MRA capable terminal may therefore be enabled to transfer between different RATs (for example, UTRAN, E-UTRAN, GERAN (GSM EDGE radio access network)). The goal of such transfers is, of course, to maintain communication continuity through each transfer. The Third Generation Partnership Project (3GPP) has defined various specifications to attempt to standardize aspects of the mechanisms used to achieve this and other goals. In particular, 3GPP technical specification (TS) 23.216 defines SR-VCC procedures in release 8 (R8). One provision of the 3GPP TS 23.216 provides for handing over of a voice session over E-UTRAN to GERAN as a circuit switched (CS) voice call.

One principle or goal for implementation of the 3GPP TS 23.216 solution is to avoid or reduce impacts on a target access network (for example, GERAN). In particular, with respect to SR-VCC from E-UTRAN toward a pre-release 8 target network, it may be desirable to utilize deployed target MSC (mobile switching center) and BSS (base station system) nodes without requiring such nodes to be updated to support the SR-VCC solution.

Against this background, one problem that has arisen during the specification of the SR-VCC solution relates to the setting of a Source ID in the BSSMAP (Base Station Subsystem Management Application Part) handover request message. The Source ID is a mandatory parameter in the MSC-BSC (base station controller) interface as defined in 3GPP TS 48.008 for the handover operation. An MSC and BSS (base station subsystem) each expect a Source ID from the source RAT during a handover. Accordingly, in case of a handover from E-UTRAN, the Source ID will typically contain the E-UTRAN source cell ID, namely the eNB Identifier (see 3GPP TS 36.413), and therefore a new codepoint in the "Cell Identifier" in 3GPP TS 48.008. However adding an E-UTRAN Source ID to MSC-MSC (i.e., MAP-E) and MSC-BSC (A-interface) will impact every target core network and GERAN elements for SR-VCC to GERAN. This may be undesirable as it may require the update of deployed preRelease-8 networks in order to support the SR-VCC and thereby deviate from the primary objective of the SR-VCC solution.

Accordingly, changes to the information exchanged for inter-RAT handovers may be desirable.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

FIG. 1, one exemplary embodiment of the invention, illustrates a schematic block diagram of a wireless communications system according to an exemplary embodiment of the present invention. Referring now to FIG. 1, an illustration of one type of system that would benefit from embodiments of the present invention is provided. The system may include a plurality of network devices and one or more mobile terminals (for example, user equipment (UE) 10). The mobile terminals may be various different examples of mobile communication devices such as portable digital assistants (PDAs), pagers, mobile televisions, gaming devices, laptop computers, mobile phones, cameras, video recorders, audio/video players, radios, global positioning system (GPS) devices, or any combination of the aforementioned, and other types of voice and text communications devices. However, it should be understood that a mobile terminal as illustrated and hereinafter described is merely illustrative of one type of device that would benefit from embodiments of the present invention and, therefore, should not be taken to limit the scope of embodiments of the present invention.

In an exemplary embodiment, each UE 10 may include an antenna (or multiple antennas) for transmitting signals to and for receiving signals from a network node such as a base site, base station, access point, node B or e-node B. In an exemplary embodiment, the UE 10 may initially be in communication with a source node 20 (for example, an e-node B of E-UTRAN) and may be in the process of being handed over to a target node 30 (for example, a base station (BS) of GERAN). As indicated above, during the handover process, the handover request message used to initiate the handover may be expected to provide an identity of the source node 20. As such, a mobile switching center (MSC) 32 expects to receive an identification from the source node 20 (for example, Source ID) in connection with the handover request. However, since for implementation of SR-VCC it is preferable to avoid modification or back fitting with respect to existing components, the provision of the Source ID from the source node 20 in a manner that defines a new parameter may require back fitting or modification of existing components (for example, the MSC 32). Some embodiments of the present invention provide for provision of the Source ID in a manner that may not require back fitting or modification of existing components.

The MSC 32 may be capable of routing calls to and from the UE 10 when the UE 10 is making and receiving calls while in communication with the target node 30. As such, the MSC 32 may provide a connection to landline trunks when the UE 10 is involved in a call. In addition, the MSC 30 may be capable of controlling the forwarding of messages to and from the UE 10, and may also control the forwarding of messages for the UE 10 to and from a messaging center. The MSC 32 may be coupled to a data network, such as a local area network (LAN), a metropolitan area network (MAN), and/or a wide area network (WAN) (for example, Third Generation Partnership Project (3GPP) Internet Protocol Multimedia Subsystem (IMS) 40).

The source node 20 may also be coupled to the 3GPP IMS 40 via one or more gateway devices such as GW 22. GW 22 may represent a serving gateway (S-GW) and/or a packet data network gateway (PDN GW). The S-GW may route and forward user data packets, while also acting as a mobility anchor for the user plane during handovers within E-UTRAN or between E-UTRAN and other RATs (for example, GERAN). The PDN GW may provide connectivity for the UE 10 to external packet data networks by being the point of exit and entry of traffic for the UE 10.

The target node 30 may also be coupled to a serving GPRS (General Packet Radio Service) support node (SGSN) 34. The SGSN 34 may be capable of performing functions similar to the MSC 32 for packet switched services. The SGSN 34 may be coupled to a mobility management element (MME) 36 that may also be in communication with the MSC 32 and the source node 20 and the GW 22. The MME 36 may be, among other things, responsible for idle mode UE tracking and paging procedures. The MME 36 may also handle GW selection for UE attachment and handover processes and may handle user authentication. In some cases, the MME 36 also handles the generation and allocation of temporary identities to UEs. Thus, for example, the MME 36 may generate the Source ID for use in accordance with an exemplary embodiment of the present invention.

3GPP TS 25.413 and 3GPP TS 23.003 define a value referred to as a Serving Area Identity (SAI), which is a parameter used in connection with UTRAN in order to function as the Source ID for source identification for SR-VCC. The SAI parameter used in connection with UTRAN is defined to be comprised of MCC+MNC+LAC+SAC, where MCC represents the mobile country code, MNC represents the mobile network code, LAC represents the location area code and SAC represents the service area code. Given the pre-existence of the SM parameter, current network devices are already configured to handle the SAI parameter provided that such devices support 3GPP standards as of R99. Accordingly, embodiments of the present invention provide for re-use of the SAI parameter in connection with identifying a source node for E-UTRAN to enable source identification for SR-VCC toward the circuit switched (CS) domain without requiring changes to network components.

In an exemplary embodiment, the MME 36 may be configured to populate the SAI with an alternative identity (for example, a MME ID) to the one currently used for source identification in association with UTRAN. The alternative identity value for the MME defined SAI may be forwarded to the target MSC during a handover in a similar manner to that for which a source MSC would transfer the SAI to a target MSC for a UTRAN handover. Thus, the MME 36 may provide an MME defined SAI. However, in some embodiments, a SR-VCC MSC may be configured to define the SAI with an alternative identity. As such, in some embodiments of the present invention, the MME 36 may not receive the source ID from a radio access network (RAN) node while an MSC receives the SAI from a radio network controller (RNC), as the MME 36 generates the SAI. The target MSC (for example, MSC 32) may then forward the MME generated or defined SAI as the Source ID to the target node 30. Accordingly, SR-VCC may be seamlessly handled by reusing existing portions of MAP-E (for example, the mobile application protocol interface between MSCs) and the A-interface without modification of the procedures.

In an exemplary embodiment, the MME 36 (or an SR-VCC MSC) may define the alternative SAI in a predefined manner. In one example, the MME 36 may define the alternative SAI using the MME's own ID. In this regard, for example, the LAC may be replaced with the MME group ID and the SAC may be replaced with the MME code. As such, the alternative SAI may be defined as MCC+MNC+MME group ID+MME code. Notably, the MME group ID is typically a 16 bit value, so it compares well and easily replaces the LAC, which may is typically also a 16 bit value. However, the MME code is typically an 8 bit value, whereas the SAC is typically a 16 bit value. Thus, in order to utilize the MME code in replacement of the SAC, some backfilling of bits (for example, the remaining 8 bit difference between the SAC and the MME code) may be performed. The backfilled bits may be assigned in any suitable fashion (for example, all ones, all zeros or any other predefined combination). Accordingly, the MME 36 may be configured (as described in greater detail below in connection with the description of FIG. 2) to define the alternative SAI using the MNC, MCC and information associated with the MME's own identification (for example, the MME group ID and the MME code).

In an alternative embodiment, the MME 36 (or an SR-VCC MSC) may be configured to implement an operator selected mechanism for populating the SAI field with an alternative SAI value. In this regard, instead of using the MME's identity information for defining the alternative SAI value, the MME 36 may be configured to utilize any suitable manner for defining the alternative SAI to identify the source for a handover, as long as the alternative SAI defined is compatible with the SAI field used in connection with source identification for UTRAN. As such, the MME 36 may be configured with coding of the operator's choice, which may be free format or generically generated, that provides a unique identification of the source MME (for example, MME 36) while still preventing any need for network configuration to back fit existing nodes.

In order to implement embodiments of the present invention, coding for a cell identification discriminator may be altered from current cell identifier coding. In this regard, the cell identifier, an element that uniquely identifies a cell within a BSS (base station subsystem) and is of variable length may include the following fields:

| | | |
|---|---|---|
| 9. Element identifier | | octet 1 |
| 10. Length | | octet 2 |
| 11. Spare | 12. Cell identification 13. discriminator | octet 3 |
| 14. Cell identification | | octet 4-n |

The coding of octet 2 is a binary number indicating the length of the remaining element. The length may depend on the Cell identification discriminator (octet 3). The coding of "Cell identification discriminator" (bits 1 to 4 of octet 3) is a binary number indicating whether the whole or a part of the Cell Global Identification (CGI) according to 3GPP TS 23.003 is used for cell identification in octet 4-n. The "Cell identification discriminator" is coded as follows:

0000 The whole Cell Global Identification, CGI, is used to identify the cell.
0001 Location Area Code, LAC, and Cell Identity, CI, is used to identify the cell.
0010 Cell Identity, CI, is used to identify the cell.
0011 No cell is associated with the transaction.
1000 Intersystem Handover to UTRAN or cdma2000. Public land mobile network (PLMN)-ID, LAC and RNC-ID (or Extended RNC-ID), is used to identify the target RNC.
1001 Intersystem Handover to UTRAN or cdma2000. The RNC-ID (or Extended RNC-ID) is used to identify the target RNC.
1010 Intersystem Handover to UTRAN or cdma2000. LAC and RNC-ID (or Extended RNC-ID) are used to identify the target RNC.
1011 Serving Area Identity, SAI, is used to identify the Serving Area of UE within UTRAN or cdma2000 or source MME in case of SR VCC.
1100 LAC, RNC-ID (or Extended RNC-ID) and Cell Identity, CI, is used to identify a UTRAN cell for cell load information.

In yet another alternative involving networks older than R99, the MME 36 may be configured to code the SAI and send the coded SAI to an SR-VCC MSC. The SR-VCC may then modify the SAI to CGI (0000) or (0001) based on O & M, in order to allow pre-R99 BSC interworking.

Accordingly, embodiments of the present invention may define an alternative SAI value for use in connection with source identification for handovers from E-UTRAN to other 3GPP networks such as GERAN in a manner that reuses a known format in order to prevent any need to update or upgrade existing network node components to handle dealing with a newly defined identifier. Instead, the MME 36 may be configured to define a unique identifier of an E-UTRAN source by utilizing either the identity of the MME itself or another (operator selected) coding that is provided in the format of the SAI value used for UTRAN source identification.

An apparatus for defining the alternative SAI will now be described in connection with FIG. 2, which illustrates an example apparatus for performing an exemplary embodiment of the present invention. The apparatus may be included in or embodied at a network device such as a MME (or an SR-VCC MSC). In this regard, the apparatus may operate in connection with an MME associated with a source node of E-UTRAN for the purposes of a handover in a multi-RAT environment.

Referring now to FIG. 2, an apparatus for enabling source identification for SR-VCC is provided. The apparatus may include or otherwise be in communication with a processor 50, a communication interface 54 and a memory device 56. The memory device 56 may include, for example, volatile and/or non-volatile memory. The memory device 56 may be configured to store information, data, applications, instructions or the like for enabling the apparatus to carry out various functions in accordance with exemplary embodiments of the present invention. For example, the memory device 56 could be configured to buffer input data for processing by the processor 50. Additionally or alternatively, the memory device 56 could be configured to store instructions for execution by the processor 50. As yet another alternative, the memory device 56 may be one of a plurality of databases that store information in the form of static and/or dynamic information, for example, in association with a particular location, event or service point.

The processor 50 may be embodied in a number of different ways. For example, the processor 50 may be embodied as a processor, a coprocessor, a controller or various other processing means or devices including integrated circuits such as, for example, an ASIC (application specific integrated circuit) or FPGA (field programmable gate array). In an exemplary embodiment, the processor 50 may be configured to execute instructions stored in the memory device 56 or otherwise accessible to the processor 50. As such, whether configured by hardware or software methods, or by a combination thereof, the processor 50 may represent an entity capable of performing operations according to embodiments of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50, which may otherwise be a general purpose processing element if not for the specific configuration provided by the instructions, to perform the algorithms and operations described herein. However, in some cases, the processor 50 may be a processor of a specific device (for example, a SGSN) adapted for employing embodiments of the present invention by further configuration of the processor 50 by instructions for performing the algorithms and operations described herein.

Meanwhile, the communication interface 54 may be embodied as any device or means embodied in either hardware, software, or a combination of hardware and software that is configured to receive and/or transmit data from/to a network and/or any other device or module in communication with the apparatus. In this regard, the communication interface 54 may include, for example, an antenna (or antennas) and supporting hardware and/or software for enabling communications with a wireless communication network. In fixed environments, the communication interface 54 may alternatively or also support wired communication. As such, the communication interface 54 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 54 may include hardware and/or software for supporting communication mechanisms such as Bluetooth, Infrared, UWB, WiFi, and/or the like.

In an exemplary embodiment, the processor 50 may be embodied as or otherwise control an identity definer 60. The identity definer 60 may be any means or device embodied in hardware, software, or a combination of hardware and software that is configured to carry out the functions of the identity definer 60 as described herein. In this regard, for example, the identity definer 60 may be configured to define an identity value for source identification associated with a first RAT (for example, E-UTRAN) by utilizing a source identification format associated with a different RAT (for example, UTRAN). As such, the identity definer 60 may utilize the SAI format to define a source identification for identifying an E-UTRAN source in a manner that can be seamlessly employed without requiring modification of existing network devices. Accordingly, in response to an indication of a handover, the apparatus employing the identity definer 60 (for example, the MME 36) may either utilize an identity associated with the apparatus (for example, the MME ID comprising the alternative SAI described above) or may use an operator determined code for generating a unique source identification conforming to the SAI format.

FIG. 3 is a flowchart of a system, method and program product according to exemplary embodiments of the invention. It will be understood that each block of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a network device (for example, a MME or MSC) and executed by a processor in the network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide steps for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method for enabling source identification for SR-VCC as provided in FIG. 3 may include receiving an indication of handover between a first RAT (for example, E-UTRAN) and a second RAT (for example, GERAN) at operation 100. The method may further include defining an identity value for source identification associated with the first RAT by utilizing a source identification format associated with a third RAT (for example, UTRAN) at operation 110. In an exemplary embodiment, the source identification format may be the SAI format, which may be used to define a source identification for identifying an E-UTRAN source in a manner that can be seamlessly employed without requiring modification of existing network devices. The method may further include providing the defined identity value to a network device associated with a target of the handover at operation 120.

In an exemplary embodiment, an apparatus for performing the method above may include a processor (for example, the processor 50) configured to perform each of the operations (100-120) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 100 to 120 may include, for example, an algorithm for managing operation of the identity definer or the processor 50.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of handover between a first radio access technology and a second radio access technology;
   defining, at a mobile switching center (MSC) or mobile management element (MME), an identity value for source identification in a handover request associated with the first radio access technology by utilizing a source identification format associated with a third radio access technology, wherein defining the identity value for source identification comprises utilizing a Serving Area Identity (SAI) format, and
   wherein defining the identity value comprises:
      defining one or more alternative identification values corresponding to one or more parameters; and
      replacing the one or more parameters with the one or more alternative identification values; and
   providing the defined identity value to a network device associated with a target of the handover.

2. The method of claim 1, wherein defining the identity value for source identification comprises utilizing the SAI format to define the source identification in a predefined manner.

3. The method of claim 1, wherein defining the identity value for source identification comprises utilizing the SAI format to define the source identification in an operator selected manner.

4. The method of claim 1, wherein defining the identity value for source identification comprises defining the source identification as a value based on an identification value associated with a mobility management element.

5. The method of claim 4, wherein defining the source identification based on the identification value associated with the mobility management element further includes backfilling bits to match a length of the identification value associated with the mobility management element to a length of the source identification.

6. The method of claim 1, wherein defining the identity value for source identification comprises utilizing a mobile switching center to modify a Serving Area Identity (SAI) format value to a Cell Global Identification (CGI) value.

7. A computer program product comprising at least one non-transitory computer-readable storage medium having computer-executable program code portions stored therein, the computer-executable program code portions comprising instructions for causing an apparatus to perform:
   receiving an indication of handover between a first radio access technology and a second radio access technology;
   defining, at a mobile switching center (MSC) or mobile management element (MME), an identity value for source identification in a handover request associated with the first radio access technology by utilizing a source identification format associated with a third radio access technology, wherein defining the identity value for source identification comprises utilizing a Serving Area Identity (SAI) format, and
   wherein defining the identity value comprises:
      defining one or more alternative identification values corresponding to one or more parameters; and
      replacing the one or more parameters with the one or more alternative identification values; and
   providing the defined identity value to a network device associated with a target of the handover.

8. The computer program product of claim 7, wherein program code instructions for defining the identity value for source identification include instructions for utilizing the SAI format to define the source identification in a predefined manner.

9. The computer program product of claim 7, wherein program code instructions for defining the identity value for source identification include instructions for utilizing the SAI format to define the source identification in an operator selected manner.

10. The computer program product of claim 7, wherein program code instructions for defining the identity value for source identification include instructions for defining the source identification as a value based on an identification value associated with a mobility management element.

11. The computer program product of claim 10, wherein program code instructions for defining the source identification based on the identification value associated with the mobility management element further include instructions for backfilling bits to match a length of the identification value associated with the mobility management element to a length of the source identification.

12. An apparatus comprising at least one processor and at least one memory including computer program code, the at least one memory and the computer program code configured to, with the processor, cause the apparatus to at least perform:
   receiving an indication of handover between a first radio access technology and a second radio access technology;
   defining, at a mobile switching center (MSC) or mobile management element (MME), an identity value for source identification in a handover request associated with the first radio access technology by utilizing a source identification format associated with a third radio access technology, wherein defining the identity value for source identification comprises utilizing a Serving Area Identity (SAI) format, and
   wherein defining the identity value comprises:
      defining one or more alternative identification values corresponding to one or more parameters; and
      replacing the one or more parameters with the one or more alternative identification values; and
   providing the defined identity value to a network device associated with a target of the handover.

13. The apparatus of claim 12, wherein the memory and computer program code are configured to, with the processor, cause the apparatus to utilize the SAI format to define the source identification in a predefined manner.

14. The apparatus of claim 12, wherein the memory and computer program code are configured to, with the processor, cause the apparatus to utilize the SAI format to define the source identification in an operator selected manner.

15. The apparatus of claim 12, wherein the memory and computer program code are configured to, with the processor, cause the apparatus to define the source identification as a value based on an identification value associated with a mobility management element.

16. The apparatus of claim 15, wherein the memory and computer program code are configured to, with the processor, cause the apparatus to utilize backfill bits to match a length of the identification value associated with the mobility management element to a length of the source identification.

17. The apparatus of claim 12, wherein the memory and computer program code are configured to, with the processor, cause the apparatus to utilize a mobile switching center to modify a Serving Area Identity (SAI) format value to a Cell Global Identification (CGI) value.

* * * * *